(No Model.)
J. F. HAY.
ANIMAL TRAP.
No. 370,700. Patented Sept. 27, 1887.
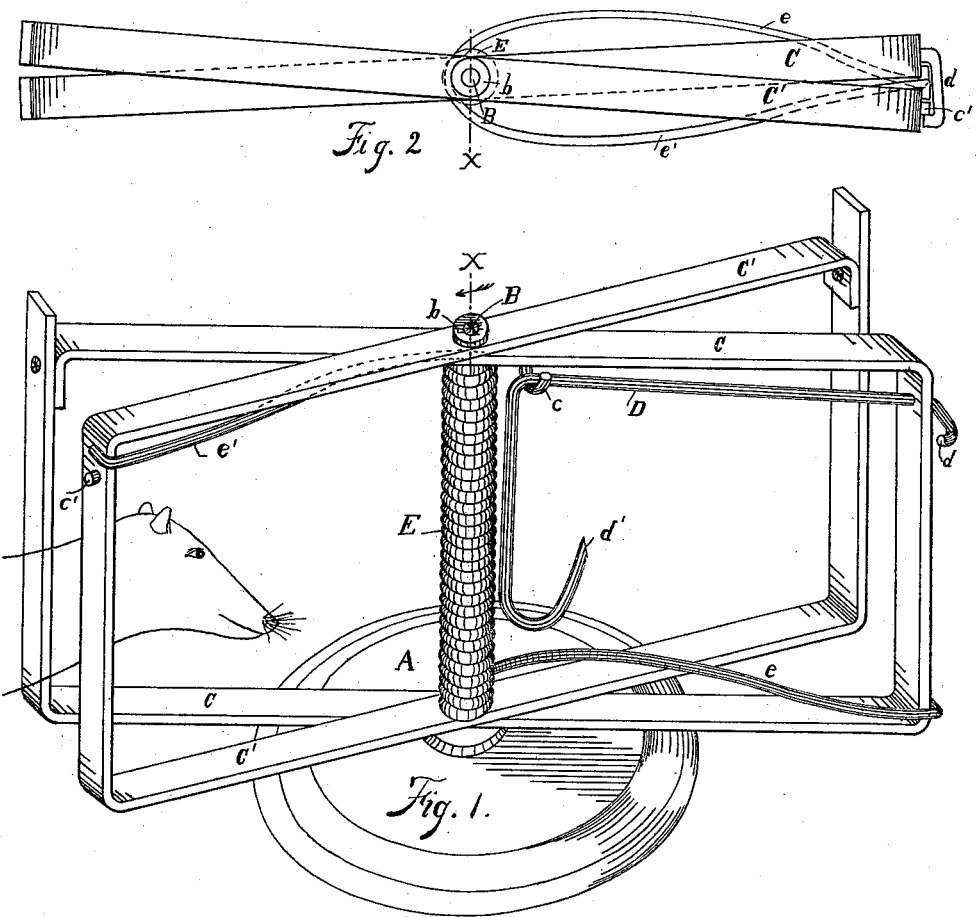
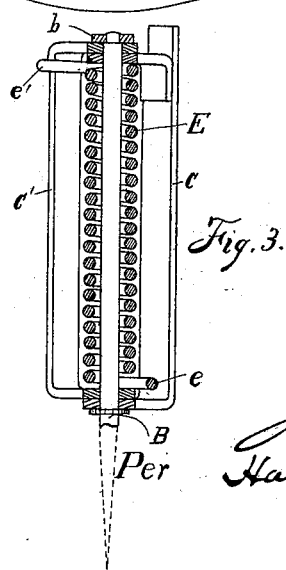
Witnesses.
Robt. N. Porter.
Chas. P. Leehning
Inventor
John F. Hay
Per Hallock & Hallock
Att's

UNITED STATES PATENT OFFICE.

JOHN F. HAY, OF ERIE, PENNSYLVANIA, ASSIGNOR TO THE LOVELL MANUFACTURING COMPANY, (LIMITED,) OF SAME PLACE.

ANIMAL-TRAP.

SPECIFICATION forming part of Letters Patent No. 370,700, dated September 27, 1887.

Application filed January 24, 1887. Serial No. 225,319. (No model.)

*To all whom it may concern:*

Be it known that I, JOHN F. HAY, a citizen of the United States, residing at Erie, in the county of Erie and State of Pennsylvania, have invented certain new and useful Improvements in Animal-Traps; and I do hereby declare the following to be a full, clear, and exact description of the invention, such as will enable others skilled in the art to which it appertains to make and use the same.

This invention relates to animal-traps, and particularly to that class of animal-traps known as "jaw-traps;" and it consists in certain new and useful improvements in the construction thereof, as will hereinafter be fully described, and pointed out in the claims.

My invention is illustrated in the accompanying drawings, as follows:

Figure 1 is a perspective view of the trap as it appears when holding an animal. Fig. 2 is a top or plan view of the jaws when the trap is set. Fig. 3 is a vertical section through the jaws, the pivot of the jaws, and the actuating-spring on the line $x\ x$ in the other figures.

The parts of the trap are as follows, reference being had to the letters of reference marked thereon: A base or stand, A, a pintle or axis for the jaws B, two jaws, C C', a bait or trigger-lever, D, and an actuating-spring, E.

The base or stand may be in the form shown in Fig. 1; or it may consist of a spike formed on the lower end of the pintle-rod B, as shown in Fig. 3 by dotted lines, which will be driven into the ground or floor.

The jaws consist of two frames, C C', made of metal. As shown, they are made in a rectangular form; but it is immaterial what form they are made in. These frames are both pivoted at their middle on the pintle B, and when so adjusted they lie one across the other.

The spring E is made of wire coiled and adjusted upon the pintle between the upper and lower bars of the frames, C C', and its ends $e\ e'$ engage the frames C C' respectively.

The trigger or bait-lever D is in the form of a rock-shaft, and lies on the under side of the upper bar of the jaw C, having one end extending through the end bar of said jaw, and terminating in a hook or catch, $d$, and its opposite end bent down parallel with the pintle and terminating in a bait-hook, $d'$. However, I do not wish to be limited to any form of trigger or catch, the principal feature of my invention being in the construction and operation of the jaws.

The trap, as shown, is set by catching the hook $d$ on the trigger D onto the pin or lug $c'$ on the jaw C'.

Both jaws move freely on the pintle B, and each jaw is actuated by a spring; hence, when the trap is sprung, each jaw acts at the same time as the other, and they meet midway between the points of departure. For example, in Fig. 2 the jaws are shown as set. Now, if they were disengaged or sprung they would meet in a plane at right angles to the plane they are shown in—that is, in the plane of the line $x$. The trap is in effect a double jaw, for when sprung it will catch an animal standing on either side of the trap, or if there were an animal on each side it would catch both of them.

The advantages of this trap are that it catches its victim from the sides just back of the head, and it will be impossible for it to escape, and generally it will be choked to death. The trap will not catch an animal by the leg, nor will it be sprung unless the animal takes the bait. To illustrate: If this trap was set in a sheep-pasture to catch dogs or wolves, no sheep would ever be caught by it, as is the case where ordinary "steel traps" are used, because the sheep would not take a bait suitable for a dog or wolf, and it could not spring the trap by stepping in it.

The trap is also simple in construction, and will be comparatively cheap to make.

I am aware that jaw-traps have been made with two frames pivoted together on a common pintle—as, for example, as shown in Patent No. 120,375, to Henry S. Frost, October 31, 1871; and I do not broadly claim such a construction. Heretofore such traps, so far as I am aware, have been made to lie flat, the jaws moving up when sprung the same as the common "steel trap," so called. Such a trap will be sprung by an animal stepping onto the bait-platform, and, when sprung, the trap must fly up from the ground, and the lower jaws are liable to catch matter on the ground and prevent the upper jaws from closing upon the animal firmly.

My trap differs from the one referred to in having its pintle standing vertical and the jaws moving horizontally. My trap will not be sprung by an animal stepping upon it; hence it will only catch an animal which will take the bait. So it may be set, for instance, in a sheep-pasture, baited with meat, and as the sheep will not disturb the bait and cannot spring it by stepping upon it, there will be no danger of injuring the sheep, while foxes, wolves, skunks, &c., may be caught. As the jaws of my trap swing horizontally on a vertical pivot, the trap will not be thrown up when sprung, and it will not catch onto matter on the ground, and it will be more certain to catch its victim.

What I claim as new is—

1. In an animal-trap, the combination of two jaw-frames pivoted together in X form on a vertical pintle, which serves as a standard or support for said frames, a spirally-coiled spring wound upon the pintle on which said frames are pivoted, and engaging one frame with one of its ends and the other frame with its other end, and a catch-trigger for setting said jaws against the action of said spring.

2. In an animal-trap, the combination of the frames C C', pivoted in X form on the vertical standard B, the spring E, coiled on said pintle and engaging the frame C by its end e and the frame C' by its end e', the bait or trigger lever D on one jaw, and a catch for engaging said trigger on the other jaw.

In testimony whereof I affix my signature in presence of two witnesses.

JOHN F. HAY.

Witnesses:
ROBT. H. PORTER,
R. N. GARDINER.